United States Patent
Krapcho

[11] 3,715,353
[45] Feb. 6, 1973

[54] (AMINOALKOXY-BENZYLIDENE)-2H-BENZOTHIAZINE-3(4H)-ONES AND RELATED COMPOUNDS

[75] Inventor: John Krapcho, Somerset, N.J.

[73] Assignee: E. R. Squibb & Sons, Inc., New York, N.Y.

[22] Filed: Oct. 12, 1970

[21] Appl. No.: 80,196

[52] U.S. Cl. ................260/243 R, 260/244, 424/246
[51] Int. Cl. ..............................................C07d 93/12
[58] Field of Search ..................................260/243 R

[56] References Cited

UNITED STATES PATENTS

| | | | |
|---|---|---|---|
| 3,503,965 | 3/1970 | Langis | 260/243 |
| 3,503,966 | 3/1970 | Metlesics et al. | 260/243 |
| 3,546,220 | 12/1970 | Stein et al. | 260/243 |

Primary Examiner—John M. Ford
Attorney—Lawrence S. Levinson, Merle J. Smith and Donald J. Perrella

[57] ABSTRACT

Compounds of the following formula and their salts are antidepressants:

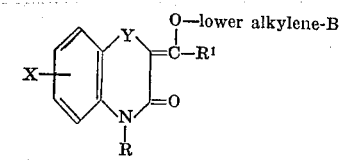

R is lower alkyl, cycloalkyl-lower alkyl or aralkyl; $R^1$ is a mono- or bicyclic radical selected from the group consisting of $X^1$-phenyl, lower alkylenedioxyphenyl, pyridyl, furyl, naphthyl or thienyl; X is hydrogen, halogen, lower alkyl, trifluoromethyl, lower alkoxy, hydroxy, lower alkylthio, nitro, amino or lower alkanoylamino; $X^1$ is hydrogen, halogen, trifluoromethyl, lower alkyl, lower alkoxy, hydroxy, lower alkylthio, amino, lower alkanoylamino or mono- or di-lower alkylamino; Y is —O—, —S—, —SO— or $-SO_2-$; and B is a basic nitrogen containing radical.

11 Claims, No Drawings

(AMINOALKOXY-BENZYLIDENE)-2H-BENZOTHIAZINE-3(4H)-ONES AND RELATED COMPOUNDS

SUMMARY OF THE INVENTION

This invention relates to new compounds of the formula

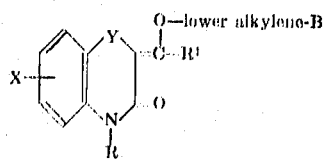

and to salts thereof, which are antidepressive agents.

The heterocyclic ring in the new compounds of formula I is a six-membered ring in which there is one nitrogen atom and one oxygen or sulfur atom. In addition the sulfur may bear one or two oxygen atoms. Thus Y is —O—, —S—, X represents hydrogen, halogen, lower alkyl, trifluoromethyl, lower alkoxy, hydroxy, lower alkylthio, nitro, amino or lower alkanoylamino. $X^1$ represents the same group as X and lower alkylamino and di-lower alkylamino in addition. All four halogens are intended by the terms "halogen" or "halo" in connection with the X-substituents, but chlorine and bromine are preferred. The lower alkyl groups represented by X and $X^1$ as well as the other groups represented by these symbols of which lower alkyl groups form a part include straight and branched chain aliphatic hydrocarbon radicals of one to seven carbon atoms such as methyl, ethyl, propyl, isopropyl, butyl, isobutyl, t-butyl, amyl and the like. The lower alkylene group in the oxygen side chain is of the same character. The lower alkanoyl radicals forming part of the lower alkanoylamino groups are the acyl radicals of the lower fatty acids having seven or less carbon atoms, e.g., acetyl, propionyl, isopropionyl, butyryl, etc.

R represents lower alkyl groups of the same kind described above, as well as cycloalkyl-lower alkyl and aralkyl groups. The latter two groups have attached to an alkyl radical of the type described above one of the 3- to 6-membered cycloaliphatics cyclopropyl, cyclobutyl, cyclopentyl or cyclohexyl, the last two being preferred, or a monocyclic, carbocyclic aryl which may be unsubstituted or substituted with a group $X^1$, in other words $X^1$-phenyl. Examples of aralkyl radicals include benzyl, phenethyl, α-methylphenethyl, 3-phenylpropyl and the $X^1$-substituted analogs.

$R^1$ represents one of the groups $X^1$-phenyl, α or β-naphthyl, lower alkylenedioxyphenyl, pyridyl, furyl or thienyl. The lower alkylene radical in the lower alkylenedioxyphenyl group is of the same type as already described.

B represents a basic monocyclic nitrogen heterocyclic containing radical of up to 18 atoms (exclusive of hydrogen). Basic nitrogen containing radicals represented by B include those represented as follows:

(II) 

wherein $R^2$ and $R^3$ each represents hydrogen, lower alkyl or hydroxy-lower alkyl. In addition, the nitrogen may join with the groups represented by $R^2$ and $R^3$ to form a 5-, 6- or 7-membered monocyclic heterocyclic (exclusive of hydrogen) containing, if desired, an oxygen, sulfur or an additional nitrogen atom (not more than two hetero atoms altogether). These heterocyclic radicals may also be substituted by one or two of the groups lower alkyl, lower alkoxy or hydroxy-lower alkyl. The lower alkyl, lower alkoxy and hydroxy-lower alkyl groups are of the type already described.

Thus the basic nitrogen containing radical II includes such basic groups as amino, lower alkylamino, e.g., methylamino, ethylamino, isopropylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino and the like.

Heterocyclic groups represented by the radical II include for example, piperidino, di(lower alkyl)piperidino, e.g., 2,3-dimethylpiperidino, 2-, 3- or 4-(lower alkoxy)piperidino, e.g., 2-methoxypiperidino, 2-, 3- or 4-(lower alkyl)piperidino, e.g., 2-, 3- or 4-methylpiperidino, pyrrolidino, (lower alkyl)pyrrolidino, e.g., 2-methylpyrrolidino, di(lower alkyl)pyrrolidino, e.g., 2,3-dimethylpyrrolidino, (lower alkoxy)pyrrolidino, e.g., 2-ethoxypyrrolidino, morpholino, (lower alkyl)morpholino, e.g., 2-methylmorpholino, di(lower alkyl)morpholino, e.g., 2,3-dimethylmorpholino, (lower alkoxy)morpholino, e.g., 2-ethoxymorpholino, thiamorpholino, (lower alkyl)thiamorpholino, e.g., 2-methylthiamorpholino, di(lower alkyl)thiamorpholino, e.g., 2,3-diethylthiamorpholino, 2,3-dimethylthiamorpholino, (lower alkoxy)-thiamorpholino, e.g., 2-methoxythiamorpholino, piperazino, (lower alkyl)piperazino, e.g., 4-methylpiperazino, 2-methylpiperazino, (hydroxy-lower alkyl)piperazino, e.g., 4-(2-hydroxyethyl)piperazino, di(lower alkyl)piperazino, e.g., 2,3-dimethylpiperazino, hexamethyleneimino and homopiperazino.

The salts included in the invention are acid addition salts and quaternary ammonium salts of the compounds of formula I.

DETAILED DESCRIPTION OF THE INVENTION

The new bases of formula I are obtained by a novel process from new intermediates of the formula (III) 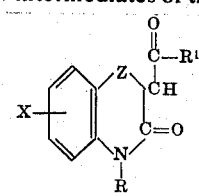

wherein X, R and $R^1$ have the same meaning defined above and Z is —O— or —S— (i.e., the same as Y excepting —SO— or —SO$_2$—), which comprises reacting the compound of formula III in an inert organic solvent like dimethylformamide, dimethylsulfoxide, liquid ammonia, toluene or the like with a condensing agent like sodium hydride, sodium amide, potassium tert. butoxide or the like and then alkylating, in situ, with an aminoalkylene halide of the formula (IV)

hal-lower alkylene-B wherein B has the same meaning defined above and hal is a halogen, preferably chlorine or bromine. The compound of formula IV may be added alone or as a solution or suspension in an organic solvent, e.g., toluene, benzene, ether, tetrahydrofuran or the like, containing as iodide like sodium iodide as catalyst.

As an alternative, and especially when one or both $R^2$ and $R^3$ are hydrogen and when one or two hydroxy-lower alkyl groups are to be introduced, it is preferable to use instead of the alkylene halide of formula IV an alkylene dihalide of the formula (V)

hal-lower alkylene-hal to react with the intermediate of formula III, then treating the product of that reaction with the appropriate amine compound.

In the initial phase, during the period of contact with the sodium hydride or other agents capable of forming an anion of formula III and before the addition of the alkylating agent, it is preferable to operate with a temperature of about 30° to 150° C. During the period of contact with the alkylating agent, an elevated temperature, e.g., in the range of about 50° to 100° C. gives good results. About 1 to 3 hours is usually sufficient. About an equimolar proportion of condensing agent is used, while the alkylating agent is preferably added in excess of the molar equivalent, e.g., about 20 to 100 percent excess.

Frequently the separation and isolation of the product is more readily effected by the formation of an insoluble acid addition salt. This is accomplished in conventional manner by adding the appropriate organic or inorganic acid to the reaction mixture and working up the product, acid addition salts such as the oxalate, picrate, perchlorate, maleate, fumarate, being preferred for this purpose. The free base or other salts may be formed by neutralizing the acid addition salt used in the isolation procedure with a base such as potassium carbonate, potassium hydroxide, sodium hydroxide or the like, then using the appropriate acid if another salt is desired.

Compounds of formula I wherein Y is sulfinyl may be obtained from compounds of formula III wherein Z is sulfur, produced by the procedure described above. These products are converted to the sulfoxide by treatment with an equivalent quantity of a peroxide like sodium periodate. When one equivalent of peroxide is used, the product is a compound of formula I wherein Y is sulfinyl; two equivalents or more of peroxide or excess of potassium permanganate result in a product wherein Y is sulfonyl. This reaction is preferably carried out in acetic acid or chloroform at room temperature or above, e.g., up to about 40° C.

When Y is $SO_2$, it is usually preferable to first form the sulfone from the intermediate of formula III by the procedure described above, then follow with the alkylation procedure.

The new intermediates of formula III are derived from o-aminothiophenols or o-aminophenols of the formula (VI) 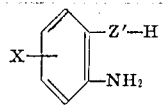

wherein Z' is sulfur or oxygen, by reaction with an acid halide. When Z' is S, the appropriate o-aminobenzenethiol is heated with a haloacetic acid like chloroacetic acid in the presence of about one equivalent of a base like sodium hydroxide. When Z' is O, the appropriate o-aminophenol is treated with a haloacetyl halide like chloroacetyl chloride and then heated in an alcohol like ethanol in the presence of potassium acetate or the like. A compound of the formula (VII) 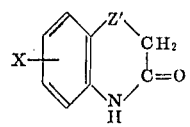

is produced.

Treatment of the compound of formula VII with about an equivalent proportion of a condensing agent like sodium hydride, sodium amide, potassium t-butoxide or the like in an inert organic medium like dimethylformamide, dimethylsulfoxide or the like, and then treating with a sulfate or halide of the formula $(R)_2SO_4$ or R-hal yields a succeeding intermediate of the formula (VIII) 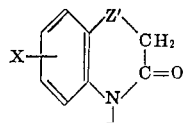

The intermediate of formula III is then obtained by alkylating the compound of formula VIII with about two equivalents of an ester of the formula (IX) 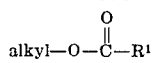

under the conditions described above.

When X or $X^1$ is amino, it is preferable to process staring compounds wherein X or $X^1$ is nitro and reduce the nitro group to an amino group as the last step. Treatment of this amino group with a lower alkanoyl halide will convert it to the lower alkanoylamino group. When X or $X^1$ is hydroxy, it is preferable to obtain this as a last step by treating the corresponding product wherein X or $X^1$ is methoxy with pyridine hydrochloride.

The compounds of formula I form salts which are also part of this invention. The salts include acid-addition salts and quaternary ammonium salts, particularly the non-toxic, physiologically acceptable members. The bases of formula I form salts by reaction with a variety of inorganic and organic acids providing acid addition salts including, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. As indicated briefly above, the acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

Quaternary ammonium salts include, for example, the lower alkyl halides and sulfates (e.g., methyl bromide and diethyl sulfate) and the monocyclic aryl-(lower alkyl) halides and sulfates (e.g., benzyl chloride, benzyl sulfate), benzenesulfonates, toluenesufonates and the like, which are formed by a conventional quaternization reaction.

Examples of suitable o-aminobenzenethiols which may be used to prepare starting compounds of formula VI wherein Z is —S— are the following:

2-aminobenzenethiol;
4-fluoro-2-aminobenzenethiol;
5-fluoro-2-aminobenzenethiol;
4-chloro-2-aminobenzenethiol;
5-chloro-2-aminobenzenethiol;
6-chloro-2-aminobenzenthiol;
5-bromo-2-aminobenzenethiol;
5-methyl-2-aminobenzenethiol;
6-methyl-2-aminobenzenethiol;
5-ethyl-2-aminobenzenethiol;
5-n-propyl-2-aminobenzenethiol;
5-n-hexyl-2-aminobenzenethiol;
3-hydroxy-2-aminobenzenethiol;
5-methoxy-2-aminobenzenethiol;
5-ethoxy-2-aminobenzenthiol;
5-n-propoxy-2-aminobenzenethiol;
5-n-hexyloxy-2-aminobenzenethiol;
4-ethylthio-2-aminobenzenethiol;
4-(trifluoromethyl)-2-aminobenzenethiol;
5-(trifluoromethyl)-2-aminobenzenethiol;
6-(trifluoromethyl)-2-aminobenzenethiol;
5-nitro-2-aminobenzenethiol;
6-nitro-2-aminobenzenethiol;
5-methylthio-2-aminobenzenethiol;

Examples of suitable o-aminophenols which may be used to prepare starting compounds of formula VI wherein Y is —O— are the following:

2-aminophenol;
2-amino-4-chlorophenol;
2-amino-4-bromophenol;
2-amino-4-nitrophenol;
2-amino-5-nitrophenol;
2-amino-6-nitrophenol;
2-amino-6-methylphenol;
2-amino-3-methylphenol;
2-amino-4-methylphenol;
2-amino-5-methylphenol;
2-amino-4-methylaminophenol;

In addition o-nitrophenols and o-nitrothiophenols may be used as starting materials from which the corresponding o-aminophenol is obtained by reduction by known methods.

The aminoalkyl halides of formulas IV and V which are used to alkylate the intermediates of formula III are a well known group of compounds which are produced by a variety of methods known in the art.

Preferred among the variables are the following: X or $X^1$ is hydrogen or halogen, especially chlorine, Y is — O— or —S—, especially the latter, R is lower alkyl, especially methyl, $R^1$ is phenyl, the lower alkylene group has two or three carbon atoms and B is di-lower alkylamino, especially dimethylamino.

The new compounds of this invention are useful as antidepressants for the relief of depression, for example, in mice, cats rats, dogs and other mammalian species, in the same manner as imipramine. For example, the single administration (i.p.) of 0.1 mg./kg. reverses reserpine induced ptosis in the mouse.

For this purpose a compound or mixture of compounds of formula I, or non-toxic, physiologically acceptable acid addition or quaternary ammonium salt thereof, may be administered orally or parenterally in a conventional dosage form such as tablet, capsule, injectable or the like. A single dose, or preferably two to four divided daily doses, provided on a basis of about 0.1 to 5 mg. per kilogram per day is appropriate. These may be conventionally formulated in an oral or parenteral dosage form by compounding about 10 to 200 mg. per unit of dosage with conventional vehicle, excipient, binder, preservative, stabilizer, flavor or the like as called for by accepted pharmaceutical practice.

The following examples are illustrative of the invention and represent preferred embodiments. Other modifications may be readily produced by suitable variation of the reactants. All temperatures are on the centigrade scale.

EXAMPLE 1

2-[α-[2-(Dimethylamino)ethoxy]benzylidene]-4-methyl-2H-benzothiazin-

3(4H)-one Maleate a) 1,4-Benzothiazin-3-one

A solution of 164 g. (4.0 moles) of sodium hydroxide in 1.5 l. of water is cooled to 15° and treated portionwise with 500 g. (4 mole) of 2-aminobenzenethiol while keeping the temperature below 30°. The resulting solution is treated with 400 g. (4.2 moles) of chloroacetic acid in 800 ml. of water while maintaining the temperature below 30°. The mixture is then stirred and refluxed for 4 hours. The oily material which initially separates becomes a granular solid. After standing overnight at room temperature, the solid is filtered and washed with water. The damp solid is digested in 1 liter of hot acetonitrile, cooled, filtered and the solvent is pressed out. This material is dissolved in 500 ml. of hot dimethylformamide and diluted with 1.5 l of acetonitrile. The product rapidly crystallizes to give 542 g. (82 percent) of colorless 1,4-benzothiazine-3-one, m.p. 178°–180°.

b) 4-Methyl-1,4-benzothiazin-3(4H)-one

A solution of 165 g. (1.0 mole) of the product of part a in 1 liter of dimethylformamide is treated portionwise with 50 g. (1.0 mole) of sodium hydride (50 percent) while maintaining the temperature below 30°. The mixture is then heated to 50°, cooled to 20°, treated dropwise with 150 ml. (1.5 mole) of dimethylsulfate (below 30°) and then stirred at 100°–105° for 2 hours. After cooling to room temperature, the mixture is poured onto 3 liters of cold water and the product is extracted with 500 ml. of chloroform (3 ×). The organic layers are combined, dried over magnesium sulfate and Darco charcoal, filtered and the filtrate is concentrated to give 258 g. of residue. The latter is dissolved in 500 ml. of cyclohexane and cooled to give an oily product. The cyclohexane is decanted and the product is dissolved in 1.5 liter of ether. The latter is extracted with 250 ml. of water (4 ×), dried over magnesium sulfate, filtered and evaporated to give 153 g. of pale yellow granular solid, m.p. 51°–54°. After crystallization from 400 ml. of cyclohexane, the nearly colorless product 4-methyl-1,4-benzothiazine-3(4H)-one weighs 132 g. (74 percent), m.p. 53°–55°.

c) 2-Benzoyl-4-methyl-2H-1,4-benzothiazin-3(4H)-one

A solution of 18.0 g. (0.1 mole) of the product of part b, and 25 ml. (0.2 mole) of methyl benzoate in 100 ml. of dimethylsulfoxide is stirred and treated portionwise with 10.0 g. (0.2 mole) of sodium hydride (50 percent) while maintaining the temperature below 25°. The resulting yellow solution is heated at 70°–75° for three hours, cooled and poured onto 1 liter of cold water. The pale yellow solid is allowed to air dry (32.5 g., m.p. 173°–176°) and then crystallized from 30 ml. of hot dimethylformamide to give 25.5 g. (90 percent) of colorless product, 2-benzoyl-4-methyl-2H-1,4-benzothiazine-3(4H)-one, m.p. 178°–180°. The product is recrystallized from dimethylformamide and then triturated with ethanol, m.p. 178°–180°.

d) 2-[α-[2-(Dimethylamino)ethoxy]benzylidene]-4-methyl-2H-benzo-thiazin-3(4H)-one Maleate A suspension of 28.3 (0.1 moles) of 2-benzoyl-4-methyl-2H-1,4-benzothiazin-3(4H)-one in 150 ml. of dimethylformamide is treated with 5.0 g. (0.1 mole) of sodium hydride (50 percent) to give an orange solution. It is warmed to 45°, cooled to 25° and treated with 52 ml. of 2.8 N dimethylaminoethyl chloride (0.15 mole) in toluene and 1 g. of sodium iodide. This mixture is heated and maintained at 100°–105° for 3 hours, cooled to 25° and poured into 1 liter of ice-water. The product separates as an oil. The mixture is extracted with 600 ml. and 300 ml. of ether (2 ×), the organic phases are combined, washed with 25 ml. of water (3 ×), dried over magnesium sulfate and Darco charcoal, filtered and concentrated to give 23.2 g. of a pale amber base. This material is dissolved in 800 ml. of ether and treated with one equivalent of alcoholic hydrogen chloride to give a yellow solid. The ether is decanted and the product is dissolved in 200 ml. of chloroform. The solvent is removed on a rotary evaporator to give 28.3 g. of yellow, non-hygroscopic solid, hydrochloride salt, m.p. 80°–82°. The solid is dissolved in 100 ml. of water, treated with 20 g. of potassium carbonate and extracted with 100 ml. of ether (3 ×). The ether phases are combined, dried and evaporated to give 22.0 g. of base. 21.6 g. of this material are dissolved in 100 ml. of acetonitrile and treated with 7.1 g. of maleic acid in 50 ml. of acetonitrile. The product slowly crystallizes from the orange-brown solution. After cooling overnight, the pale yellow solid is filtered and dried, m.p. 158°–160°. Recrystallization of this material from 50 ml. of acetonitrile gives 14.7 g. (31 percent) of yellow product, 2-[α-[2-(dimethylamino)ethoxy]benzylidene]-4-methyl-2H-benzothiazin-3-(4H)-one maleate, m.p. 158°–160°.

EXAMPLE 2

2-[α-[3-(Dimethylamino)propoxy]benzylidene]-4-methyl-2H-1,4- benzothiazin-3(4H)-one Maleate

A stirred suspension of 28 g. (0.1 mole) of 2-benzoyl-4-methyl-2H-1,4-benzothiazin-3(4H)-one in 150 ml. of dimethyl-sulfoxide is cooled to 16° and treated portionwise with 5 g. (0.1 mole) of sodium hydride (50 percent). Hydrogen is evolved as the temperature rises to 19°. After stirring 0.5 hour at 20°, then allowing to warm to 25° (additional 0.5 hour), 70 ml. (0.15 mole) of a 2.1 N toluene solution of 3-dimethylamino-propyl chloride and 1 g. of pulverized sodium iodide is added and the mixture is heated at 70°–75 for three hours, cooled, and poured into 1 liter of ice-water.

After standing in the cold room overnight, the mixture is extracted with ether (3 × 300 ml.). An ether-insoluble solid fraction is filtered off. The combined ether extracts are washed with water (3 × 100 ml.), dried over magnesium sulfate and the solvent is evaporated to give 17 g. of an oily base. The latter is taken up in ether, cooled, and extracted with a cold solution of 7 ml. of concentrated hydrochloric acid in 25 ml. of water, followed by 50 ml. of water. The combined aqueous layers are washed with ether, cooled and made basic with 15 g. of potassium carbonate. The liberated base is extracted with ether (3 × 200 ml.), dried, and the solvent is evaporated to give 10.6 g. of an oily base. The latter is dissolved in 50 ml. of warm acetonitrile, treated with 3.4 g. of maleic acid and diluted with 50 ml. of ether. On rubbing, the crystalline maleate gradually separates. Recrystallization from 60 ml. of isopropyl alcohol gives 2-[α-[3-(dimethylamino)-propoxy]benzylidene]-4-methyl-2H-1,4-benzothiazin-3(4H)-one maleate as a pale yellow material, m.p. 155°–157°.

EXAMPLE 3

4-Cyclopentylmethyl-2-[α-[2-(diethylamino)ethoxy]naphthylidene]-

2H-benzothiazin-3(4H)-one Maleate

Utilizing the procedure of Example 1 but substituting in part b, cyclopentylmethyl bromide for dimethysulfate, in part c, the methyl ester of 1-naphthalenecarboxylic acid for methyl benzoate, and in part d, diethylaminoethyl chloride for dimethylaminoethyl chloride, the above named product is obtained.

EXAMPLE 4

4,6-Dimethyl-2-[α-[2-(dimethylamino)ethoxy]-p-methylbenzylidene]-

2H-benzothiazin-3(4H)-one Maleate

Utilizing the procedure of Example 1 but substituting in part a 2-amino-4-methylbenzenethiol for 2-aminobenzenethiol, and in part c, the methyl ester of p-methylbenzoic acid for methyl benzoate, the above named product is obtained.

EXAMPLE 5

2-[α-[2-(Dimethylamino)ethoxy]benzylidene]-4-methyl-2H-benzothiazin-

3(4H)-one-1-oxide Maleate

Interaction of the material from Example 1 with an equivalent quantity of sodium periodate in water at 40°, followed by concentration of the mixture to a small volume, the above named product is obtained.

EXAMPLE 6

2-[α-[2-(Dimethylamino)ethoxy]benzylidene]-4-methyl-2H-benzothiazin-

3(4H)-one-1,1-dioxide Maleate

Oxidation of the material from part b of Example 1 in acetic acid with excess potassium permanganate at 40°-45 yields 4-methyl-1,4-benzothiazin-3(4H)-one-1,1-dioxide. Interaction of this dioxide with methyl benzoate and then with dimethylaminoethyl chloride in the same manner as described in Example 1, parts c and d, the above named product is obtained.

EXAMPLE 7

4-Benzyl-2-[α-[3-(methylamino)propoxy]-3,4-methylenedioxybenzylidene]-

2H-benzoxazin-3(4H)-one Maleate

Utilizing the procedure of Example 1 but substituting in part b, 1,4-benzoxazin-3(4H)-one for 1,4-benzothiazin-3(4H)-one and benzyl chloride for dimethylsulfate, in part c, the methyl ester of 3,4-methylenedioxybenzoic acid for methyl benzoate; and in part d, 3-methylaminopropyl chloride for 2-dimethylaminoethyl chloride, the above named product is obtained.

EXAMPLE 8

2-[α-[2-(Dimethylamino)ethoxy]-3-chlorobenzylidene]-4-ethyl-6- trifluoromethyl-2H-benzothiazin-3(4H)-one Maleate

Utilizing the procedure of Example 1 but substituting in part a, 2-amino-4-trifluoromethylbenzenethiol for 2-amino-benzenethiol, in part b, diethyl sulfate for dimethyl sulfate, in part c, methyl 3-chlorobenzoate for methyl benzoate, and in part d, diethylaminoethyl bromide for dimethylaminoethyl chloride, the above named product is obtained.

EXAMPLE 9

2-[α-[2-(Dimethylamino)ethoxy]-3-chlorobenzylidene]-4-ethyl-6- trifluoromethyl-2H-benzothiazin-3(4H)-one-1-oxide Maleate

Interaction of the material from Example 8 with an equivalent of sodium periodate in water at 40°, followed by concentration of the mixture to a small volume, the above named product is obtained.

EXAMPLE 10

7-Ethylthio-4-n-propyl-2-[α-[3-(n-propylamino)propoxy]-3-methylbenzilidene-2H-benzothiazin-3(4H)-one, Maleate Utilizing the procedure of Example 1 but substituting in part a, 5-ethylthio-2-aminobenzenethiol for 2-aminobenzenethiol, in part b, n-propyl bromide for dimethylsulfate, in part c, the methyl ester of 3-methyl benzoic acid for methyl benzoate, and in part d, n-propylaminopropyl chloride for 2-dimethylaminoethyl chloride, the above named product is obtained.

Following the procedure of Example 1, but substituting in part d the

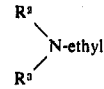

chloride indicated below for the 2-dimethylamino chloride, the corresponding

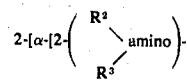

ethoxy]benzylidene]-4-methyl-2H-benzothiazine-3(4H)-one maleate is obtained:

Example

| | |
|---|---|
| 11 | amino |
| 12 | di(hydroxy-lower alkyl)amino |
| 13 | piperidino |
| 14 | 2,6-dimethylmorpholino |
| 15 | pyrrolidino |
| 16 | 4-methylpiperidino |
| 17 | 2-methoxypiperidino |
| 18 | thiamorpholino |
| 19 | homopiperazino |
| 20 | 3,4-dimethylpyrrolidino |

By following the procedure of Example 5 and treating each of the compounds of Examples 11 to 20 with sodium periodate yields the corresponding sulfoxide of each.

The sulfones corresponding to the products of Examples 11 to 20, respectively, are produced according to the procedure of Example 6.

EXAMPLE 21

4-Methyl-2-[α-[2-(piperidino)ethoxy]-3-pyridylmethylene]-2H- benzothiazine-3(4H)-one Maleate

Utilizing the procedure of Example 1, but substituting in part c methyl nicotinate for methyl benzoate, and in part d, 2-piperidinoethyl chloride for dimethylaminoethyl chloride, the above named product is obtained.

EXAMPLE 22

4-(Cyclohexylmethyl)-2-[α-[2-(dimethylamino)ethoxy]2-thenylidene]-

2H-benzoxazin-3(4H)-one Maleate

Utilizing the procedure of Example 1, but substituting in part b, 1,4-benzoxazin-3(4H)-one for 1,4-benzothiazine-3(4H)-one and cyclohexymethyl bromide for dimethylsulfate, and in part c, the methyl ester of 2-thiophenecarboxylic acid for methyl benzoate, the above named product is obtained.

EXAMPLE 23

4-Benzyl-2-[α-[2-(diethylaminoethoxy)-2-furylidene]-2H-benzoxazin-

3(4H)-one Maleate

Utilizing the procedure of Example 1, but substituting in part b, 1,4-benzoxazin-3(4H)-one for 1,4-benzothiazin-3(4H)-one and benzyl chloride for dimethyl sulfate, in part c, methyl furoate for methyl benzoate and in part d, diethylamino-ethyl chloride for dimethylaminoethyl chloride, the above named product is obtained.

Similarly, by substituting 1,4-benzoxazine-3(4H)-one as the starting material in each of Examples 1 to 23, there is obtained the 2H-benzoxazine-3(4H)-one corresponding to the 2H-benzothiazin-3(4H)-one of each of those examples.

By following the procedure of Example 1, but substituting a 2-aminobenzenethiol having the X-substituent indicated below, the X-substituted-2-[α-[2-(dimethylamino)ethoxy]benzylidene]-4-methyl-2H-benzothiazin-3(4H)-ones and their hydrochlorides and the maleates, respectively, shown in the second column below, are obtained as products:

| Example | 2-aminobenzenethiol/X | Product/X |
|---|---|---|
| 24 | 4-Br | 6-Br |
| 25 | 6-Cl | 8-Cl |
| 26 | 3-CH₃ | 5-CH₃ |
| 27 | 5-OCH₃ | 7-OCH₃ |
| 28 | 4-OH | 6-OH |
| 29 | 5-NO₂ | 7-NO₂ |
| 30 | 5-CH₃CONH | 7-CH₃CONH |
| 31 | 4-(CH₃)₂N | 6-(CH₃)₂N |
| 32 | 4-CF₃ | 6-CF₃ |
| 33 | 4-C₂H₅S | 6-C₂H₅S |

EXAMPLE 34

2-[α-[2-(Dimethylamino)ethoxy]benzylidene]-4-methyl-2H-benzothiazin-

3(4H)-one Methobromide

A solution of the free base of Example 1 in acetonitrile (1 g./5 ml.) is treated with excess methyl bromide at room temperature. After standing overnight at room temperature, the solvent is removed under reduced pressure to give the methobromide salt.

EXAMPLE 35

7-Amino-2-[α-[2-(Dimethylamino)ethoxy]benzylidene]-4-methyl-2H- benzothiazin-3(4H)-one maleate

A solution of material from Example 29 in ethanol is treated with hydrogen in the presence of palladium carbon and the solvent then removed to give the above named product.

EXAMPLE 36

2-[α-[2-(Dimethylamino)ethoxy]benzylidene]-4-methyl-7-propionamido- 2H-benzothiazin-3(4H)-one Hydrochloride A solution of the base from Example 35 in chloroform is treated with one equivalent of propionyl chloride, heated to reflux for one hour and the solvent evaporated to give the above named product.

EXAMPLE 37

2-[α-[2-(Dimethylamino)ethoxy]benzylidene]-7-hydroxy-4-methyl- 2H-benzothiazin-3(4H)-one Maleate The product of Example 27 is admixed and heated with excess pyridine hydrochloride at 100° for 30 minutes and then cooled and diluted with ether to give the above named product.

What is claimed is:

1. A compound of the formula

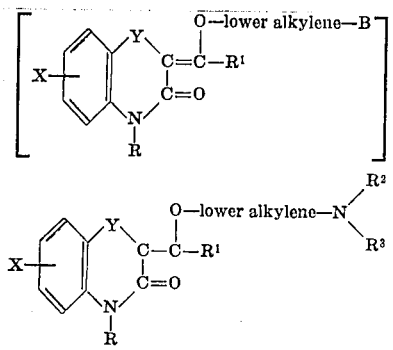

wherein R is lower alkyl, cycloalkyl-lower alkyl or X¹-phenyl-lower alkyl; R¹ is X¹-phenyl, naphthyl, lower alkylenedioxyphenyl, pyridyl, furyl or thienyl; X is hydrogen, halogen, lower alkyl, trifluoromethyl, lower alkoxy, hydroxy, lower alkylthio, nitro, amino or lower alkanoylamino; X¹ is hydrogen, halogen, trifluoromethyl, lower alkyl, lower alkoxy, hydroxy, lower alkylthio, amino, lower alkanoylamino, lower alkylamino or di(lower alkyl)amino; Y is —S—, —SO— or —SO₂—; and the group

is amino, lower alkylamino, di(lower alkyl)amino, (hydroxy-lower alkyl)amino, di(hydroxy-lower alkyl)amino, piperidino, (lower-alkyl)piperidino, di(lower alkyl)piperidino, (lower alkoxy)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)-thiamorpholino, di(lower alkyl)thiamorpholino, (lower alkoxy)thiamorpholino, piperazino, (lower alkyl)piperazino, (hydroxy-lower alkyl)piperazino, di(lower alkyl)piperazino, hexamethyleneimino and homopiperazino, and acid addition, lower alkyl halide, lower alkyl sulfate, benzenesulfonate and toluenesulfonate salts thereof.

2. A compound as in claim 1 wherein Y is —S—.

3. A compound as in claim 1 wherein R is lower alkyl, $R^1$ and X each is hydrogen, Y is sulfur and B is di(lower alkylamino).

4. A compound as in claim 1 wherein R is lower alkyl, $R^1$ and X each is hydrogen, Y is —SO— and B is di(lower alkyl)amino.

5. A compound as in claim 1 wherein R is lower alkyl, $R^1$ and X each is hydrogen, Y is —SO$_2$— and B is di(lower alkyl)-amino.

6. A compound as in claim 3 wherein R is methyl, B is dimethylamino and the lower alkylene group has two carbons.

7. A salt of a compound as in claim 6.

8. A compound of the formula

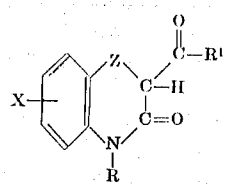

wherein X, R and $R^1$ have the same meaning as in claim 1 and Z is sulfur.

9. A compound as in claim 8 wherein R is methyl, $R^1$ is phenyl, X is hydrogen.

10. A process for the production of a compound of claim 1 which comprises reacting a compound of claim 9 in an inert organic solvent with a condensing agent of the group consisting of sodium hydride, sodium amide or potassium tert. butoxide at a temperature in the range of about 30° to 150° C, then either alkylating with an excess of aminoalkylene halide of the formula

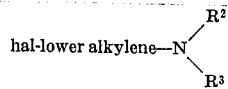

wherein hal is halogen and $R^2$ and $R^3$ have the same meaning as in claim 1, at a temperature in the range of about 50° to 100° C. or alkylating with an alkylene dihalide of the formula hal-lower alkylene-hal wherein hal is halogen, and treating the product of that reaction with an amine

wherein $R^2$ and $R^3$ have the same meaning as in claim 1.

11. A process wherein the product of the process of claim 10 is oxidized with one equivalent or more of peroxide.

UNITED STATES PATENT OFFICE
CERTIFICATE OF CORRECTION

Patent No. 3,715,353            Dated February 6, 1973

Inventor(s) John Krapcho

It is certified that error appears in the above-identified patent and that said Letters Patent are hereby corrected as shown below:

Column 1, the first formula should read --

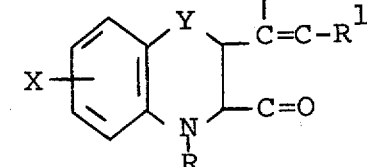

-- Column 1, line 19 add --

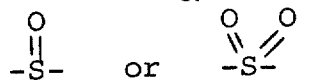   -- Column 12; claim 1 delete the formula in brackets.

Signed and sealed this 10th day of July 1973.

(SEAL)
Attest:

EDWARD M. FLETCHER, JR.
Attesting Officer

Rene Tegtmeyer
Acting Commissioner of Patents